United States Patent Office 2,874,562
Patented Feb. 24, 1959

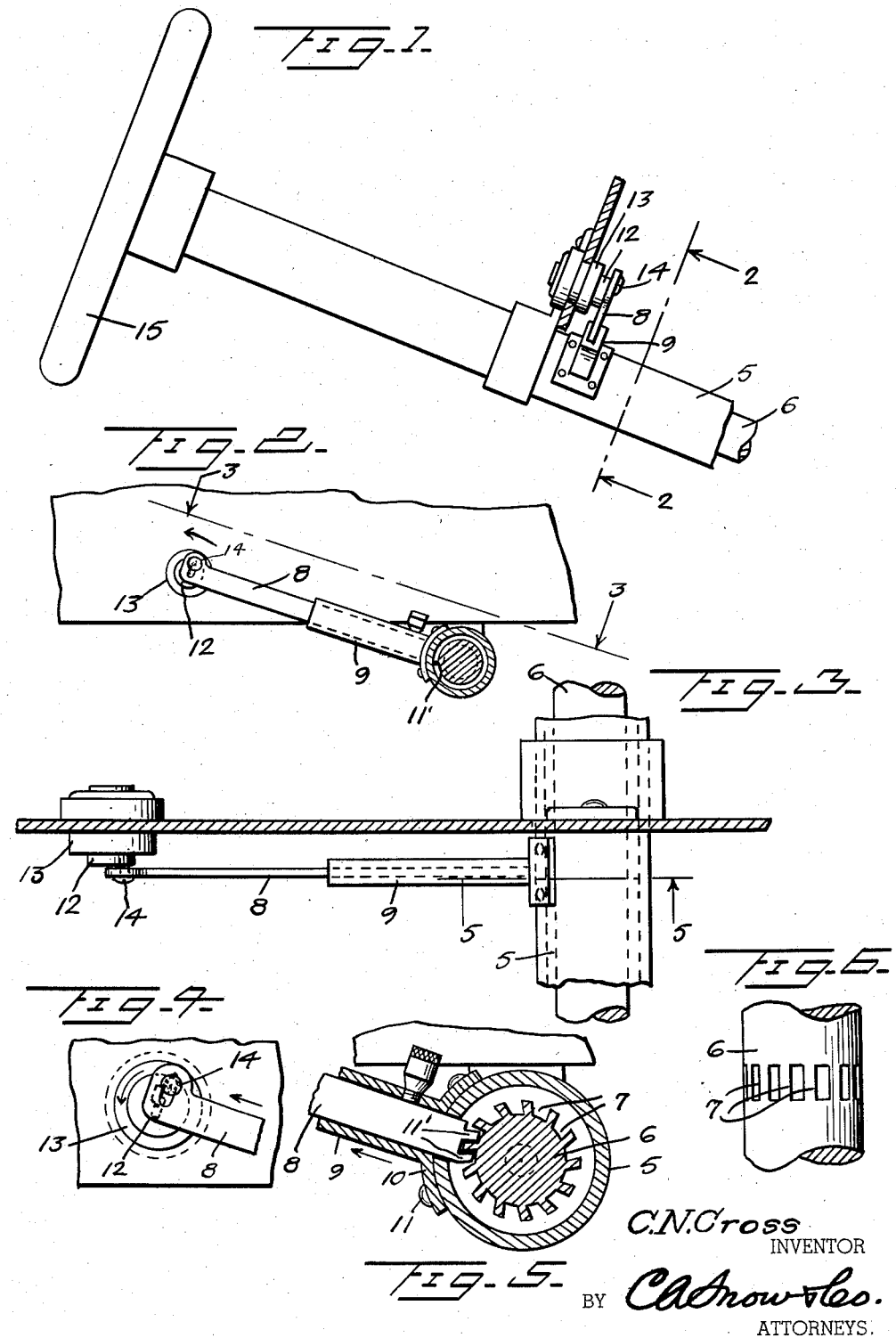

2,874,562

MOTOR VEHICLE STEERING WHEEL LOCK

Christopher N. Cross, Chicago, Ill.

Application December 11, 1956, Serial No. 627,635

1 Claim. (Cl. 70—252)

This invention relates to a device designed for preventing the theft and unauthorized use of motor vehicles.

The primary object of the invention is to provide mechanism controlled by the operation of the barrel of the conventional ignition switch, in breaking the ignition circuit of the motor vehicle, for locking the steering shaft against movement while the car is parked or out of use.

An important object of the invention is to provide a sliding bolt supported adjacent to the steering shaft for contact therewith, and eccentrically connected to the ignition switch barrel so that as the switch barrel rotates, the sliding bolt will be moved to a position to lock the steering shaft against movement simultaneously with the operation of the switch to break the ignition circuit, thereby rendering the motor vehicle inoperative.

Still another object of the invention is to provide a mechanical mechanism for locking the steering shaft of a motor vehicle against unauthorized use, which locking mechanism is in the form of an attachment to be installed at a minimum cost, and without the necessity of making extensive alterations in the conventional motor vehicle construction in mounting the attachment.

Other and further objects and advantages of the invention will be hereinafter described and the novel features thereof defined in the appended claim.

Referring to the drawing:

Figure 1 is an elevational view illustrating a motor vehicle steering column and shaft with a steering shaft locking mechanism constructed in accordance with the invention as secured to the instrument panel of the motor vehicle.

Fig. 2 is a sectional view taken on line 2—2 of Fig. 1.

Fig. 3 is a sectional view taken on line 3—3 of Fig. 2.

Fig. 4 is a fragmental elevational view illustrating the connection between the rotating barrel of the ignition switch and the steering shaft locking arm.

Fig. 5 is a sectional view taken on line 5—5 of Fig. 3.

Fig. 6 is a fragmental elevational view illustrating the steering shaft as provided with grooves to receive the locking fingers of the locking arm.

Referring to the drawing in detail, the reference character 5 illustrates a conventional steering shaft housing, in which the steering shaft 6 is mounted in the usual and well known manner.

As better shown by Fig. 5 of the drawing, the steering shaft 6 is provided with grooves 7 formed in the periphery thereof, the grooves being obliquely angled relative to the radius of the steering shaft.

The reference character 8 indicates the sliding bolt of the lock, which operates through the tubular housing 9 that is formed with a flanged end 10 secured to the housing 5 by means of bolts 11. The housing 5 is formed with an opening, and the tubular housing 9 fits against the housing 5 adjacent to the opening, so that the sliding bolt 8 which operates through the tubular housing 9 may extend into the housing 5.

The sliding bolt 8 is formed with angularly disposed fingers 11' disposed on the free end of the sliding bolt, the fingers 11' being angled to engage within corresponding adjacent grooves 7 of the steering shaft 6, as shown by Fig. 5, when the steering shaft is in a locked position.

One end of the sliding bolt 8 is connected to the barrel 12 of the usual ignition switch, indicated by the reference character 13, and this connection between the sliding bolt 8 and rotating barrel 12, is located eccentrically of the barrel 12 shown by Fig. 4 of the drawing, so that as the barrel 12 rotates in moving the barrel and switch to either its position to break or make the circuit of the ignition system of the motor vehicle, the sliding bolt 8 will be reciprocated within its housing 9 to either lock or unlock the steering shaft.

It is obvious that the connection between the sliding bolt 8 and barrel 12, is made by means of the headed pin 14 that passes through an elongated slot in an offset end portion of the sliding bolt and has one end thereof secured to one end of the barrel 12.

From the foregoing it will be seen that due to the construction shown and described the sliding bolt will be operated to move the fingers 11' thereof into the grooves 7 of the steering shaft, when the ignition switch is moved to break the circuit to the ignition system of the motor vehicle, with the result that the locking mechanism will hold the steering shaft against rotation and thereby prevent the operation of the vehicle by unauthorized persons.

It will also be obvious that when the switch is turned to complete the ignition system, the sliding bolt 8 will be moved in the opposite direction, thus disengaging the steering shaft and allowing the steering shaft to be operated in the usual manner by the steering wheel, which in the present showing is indicated by the reference character 15.

Having thus described the invention, what is claimed is:

The combination with a rotary barrel of the ignition switch of a motor vehicle, and a steering shaft having a peripheral ring of grooves angularly offset relative to the radius of the shaft and a tubular steering shaft housing having an opening in the wall thereof, of a steering shaft locking attachment comprising a tubular housing, a curved flange formed at one end of said tubular housing adapted to fit over the wall of said steering shaft housing with said tubular housing in register with said opening of the tubular steering shaft housing, a locking bolt slidable through said tubular housing and registering openings, said locking bolt having a slotted offset end and a pin extending through the slot in said end eccentrically connecting said bolt with said rotary barrel of said ignition switch, and angularly offset teeth on one end of said sliding bolt adapted to interlock with the angularly offset grooves of said steering shaft holding said steering shaft against movement when said rotary barrel is rotated in one direction.

References Cited in the file of this patent

UNITED STATES PATENTS

| | | |
|---|---|---|
| 1,714,426 | Kuepfer | May 21, 1929 |
| 1,742,963 | McGlynn | Jan. 7, 1930 |
| 1,786,186 | Bauermeister | Dec. 23, 1930 |
| 1,867,831 | Hershey | July 19, 1932 |
| 2,314,568 | Wharam | Mar. 23, 1943 |

FOREIGN PATENTS

| | | |
|---|---|---|
| 313,129 | Great Britain | 1931 |